No. 656,482. Patented Aug. 21, 1900.
J. P. SCHOWALTER, G. A. ROSENBAUER & J. MIOTKE.
METHOD OF MAKING BICYCLE HANDLE BAR HEADS.
(Application filed July 13, 1899.)
(No Model.) 2 Sheets—Sheet 1.
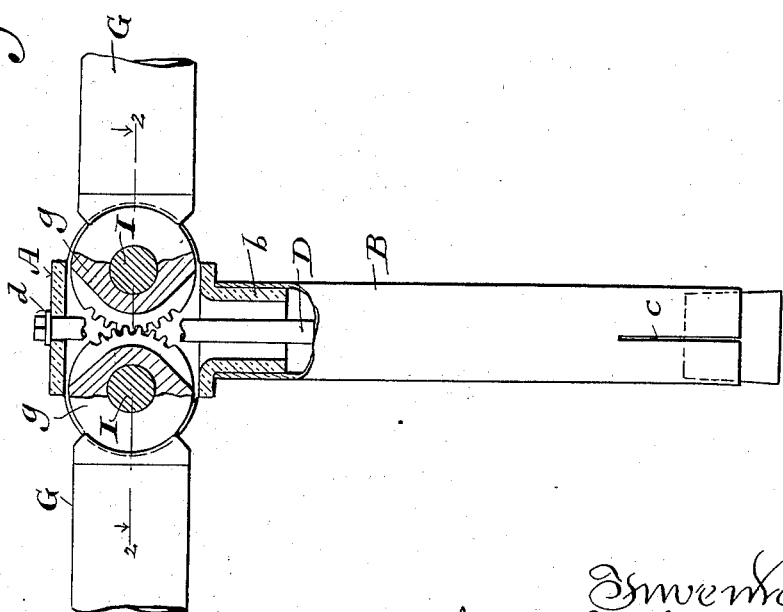

No. 656,482. Patented Aug. 21, 1900.
J. P. SCHOWALTER, G. A. ROSENBAUER & J. MIOTKE.
METHOD OF MAKING BICYCLE HANDLE BAR HEADS.
(Application filed July 13, 1899.)
(No Model.) 2 Sheets—Sheet 2.
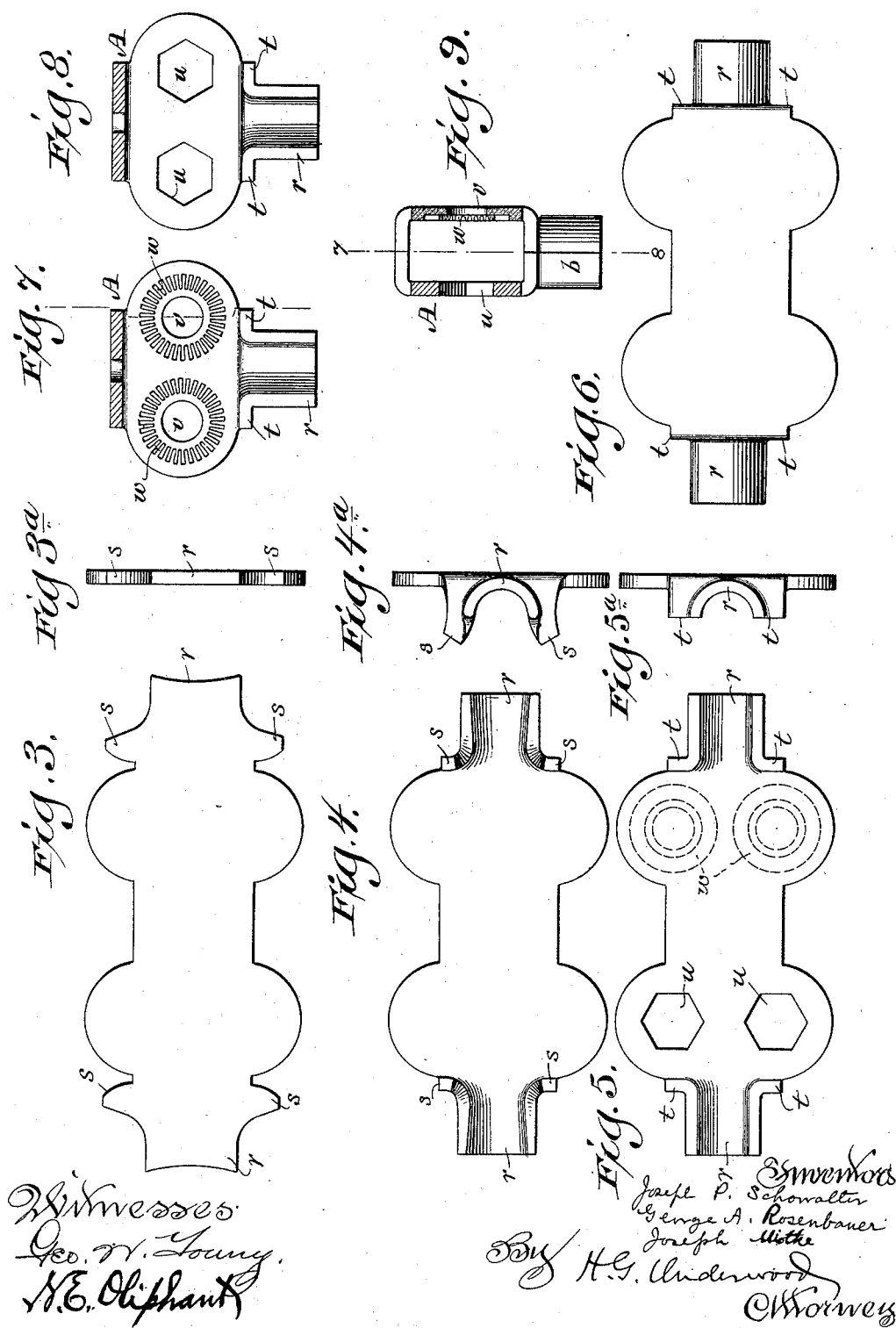

UNITED STATES PATENT OFFICE.

JOSEPH P. SCHOWALTER, GEORGE A. ROSENBAUER, AND JOSEPH MIOTKE, OF MILWAUKEE, WISCONSIN, ASSIGNORS TO THE SANGER HANDLE BAR AND PLATING COMPANY, OF SAME PLACE.

METHOD OF MAKING BICYCLE HANDLE-BAR HEADS.

SPECIFICATION forming part of Letters Patent No. 656,482, dated August 21, 1900.

Application filed July 13, 1899. Serial No. 723,665. (No model.)

*To all whom it may concern:*

Be it known that we, JOSEPH P. SCHOWALTER, GEORGE A. ROSENBAUER, and JOSEPH MIOTKE, citizens of the United States, and residents of Milwaukee, in the county of Milwaukee and State of Wisconsin, have invented certain new and useful Improvements in Methods of Making Bicycle Handle-Bar Heads; and we do hereby declare that the following is a full, clear, and exact description thereof.

Our invention has for its object to cheapen the production and to strengthen the heads of that type of bicycle handle-bars having the grip members thereof adjustable on separate pivots, such as shown in application, Serial No. 702,677, filed January 19, 1899, (now Patent No. 634,505, dated October 10, 1899,) said invention consisting in our method of making the heads from blanks of peculiar construction, as hereinafter particularly set forth with reference to the accompanying drawings and subsequently claimed.

Figure 1 of the drawings represents an elevation of a portion of a finished handle-bar, partly broken and in section, its head being in accordance with our invention; Fig. 2, a horizontal section on the plane indicated by line 2 2 in the preceding figure; Fig. 3, a plan view of a flat sheet-steel blank from which the head portion of our handle-bar is fashioned; Fig. 3ª, an end view of the blank; Fig. 4, a plan view of the inside of the headpiece after the same has been subjected to a stamping operation; Fig. 4ª, an end view of what is shown in the preceding figure; Fig. 5, another plan view of the inside of said headpiece after subjection to another stamping operation; Fig. 5ª, an end view of what is shown in the preceding figure; Fig. 6, an outside plan view of the aforesaid headpiece at that stage of its manufacture shown by Figs. 5 and 5ª; Figs. 7 and 8, sectional views of the finished head on the plane indicated by line 7 8 in the succeeding figure, and Fig. 9 a partly-sectional end view of said finished head.

Referring by letter to the drawings, A indicates the angular shell that constitutes the central head of a finished bicycle handle-bar, the depending annular stem $b$ of which is brazed in a corresponding tube B, herein shown as having longitudinal kerfs $c$ at intervals circumferentially of its lower end, said stem and tube constituting the handle-bar shank designed for vertically-adjustable connection with the steering-fork shank of a bicycle. Arranged to turn in the head A, central thereof, we show an adjusting-rod D for an inside expander fitting the kerfed lower end of the aforesaid shank, the upper end of the rod being squared to accommodate a wrench and provided with a stop-flange $d$, that rests upon the top of said head. A pair of gear-toothed rounded inner ends $g$ of handle-bar grip members G are shown arranged on a corresponding pair of pivot-bolts I, within head A, to mesh with each other, and the toothed face extremities of the grip members are peripherally grooved to afford clearance for the expander-adjusting rod D, above specified. The head of each pivot-bolt I is of angular contour and fits snug in a corresponding aperture in a side of the head A, the flat inner face of the bolt-head being parallel with and against a side of the rounded toothed end of the corresponding grip member of the handle-bar. By having their heads in angular fit in the head A the pivot-bolts I are held against turning. The toothed end of each grip member G has that side thereof farthest from the head of its pivot-bolt provided with a circular series of radial wedge-ribs, and this ribbed surface meshes with a similar inner surface of the handle-bar head. Washers $p$ and clamp-nuts L engage the pivot-bolts outside the head A, and by loosening the nuts slack is had to permit disengagement of the opposing wedge-rib surfaces, so that the grip members G may be readily adjusted to various angles, said grip members turning together in said head on said pivot-bolts. The adjustment having been effected, tightening of the loosened nuts will cause locking together of the opposing wedge-rib surfaces, above specified, to maintain the grip members in adjusted position, the handle-bar being then rigid at all points.

In practice the metal in the toothed ends of the grip members and ribbed portion of the head A is made considerably harder than that in the remainder of said grip members and head to obtain the best results.

The finished head is the result of a number of operations subsequent to those necessary to obtain a flat sheet-steel blank similar to that shown by Figs. 3 and 3ª, this blank having a narrow central portion and narrowed ends provided with opposite lateral ears, the widest portions of said blank being preferably rounded at their extremities. This blank is an article complete in itself, so as to be the subject of separate manufacture and sale as the product of one concern for the use of other concerns employed in the manufacture of bicycle handle-bars similar to the one herein set forth, and in practice it will be found advantageous to make the manufacture of the head-blanks a separate industry. The blank is first subjected to a stamping operation by which its narrowed ends $r$ and opposite lateral ears $s$ are struck up to stand as shown in Figs. 4 and 4ª. By another stamping operation the inturned ears $s$ of the headpiece, now at approximately right angles to the widest portions of said headpiece, are swaged down flush with the longitudinal edges of the now half-round ends $r$ of the same to form angular shoulders $t$, as shown in Figs. 5 to 8, inclusive, after which the bolt-apertures $u$ $v$ and the circular series of radial wedge-ribs $w$ are punched in the aforesaid headpiece. The wedge-rib portion of the headpiece is subsequently hardened and said headpiece bent so as to form the angular shell shown by Fig. 9. The narrow central portion of the headpiece becomes the angular top of the shell parallel with the now horizontal angularly-shouldered portions of said headpiece brought together to form its apertured bottom, from which depends the annular stem $b$, that is brazed in the tube B, above specified, said stem being formed by the meeting of the half-round ends of the aforesaid headpiece, as seen in Fig. 9. If the head is to be utilized as part of a handle-bar provided with an inside expander, an aperture is punched in the top of said head to accommodate the expander-adjusting rod.

The top and bottom of the finished head being of less length than its sides and having their extremities on the same vertical planes, the necessary play-space is had for pivotal adjustment of the meshing toothed ends of the handle-bar-grip members. By swaging back the inturned ears $s$ of the headpiece subsequent to the operation by which the above-described blank headpiece is formed, similar to the illustrations, Figs. 4 and 4ª, there is a compression of the metal and strengthening of the finished head at what has been found the weakest points of same when made by casting.

Having thus described our invention, what we claim as new, and desire to secure by Letters Patent, is—

A method of making a bicycle handle-bar head from a primarily-flat sheet-steel blank or headpiece having a central narrow portion, narrow ends and ears extending laterally in opposite directions from said end adjacent to the widest portions of the headpiece; said method consisting in first striking up the ends and ears of the headpiece to a half-round, then swaging the ears back flush with the longitudinal edges of the now half-round ends to form angular shoulders, thereafter punching the widest portions of the headpiece to form bolt-apertures and circular series of radial wedge-ribs around certain of said apertures, hardening the ribbed portion of the headpiece and finally bending said headpiece to form an angular shell, the central narrow portion of the headpiece becoming the top of the shell parallel with the angular-shouldered portions of said headpiece brought together on a horizontal plane to form an apertured split bottom of said shell, the half-round ends of the headpiece meeting to form a split stem depending from said bottom, and the widest portions of said headpiece being parallel vertical sides of said shell with the aforesaid ribs upon the inner surface of one of said sides.

In testimony that we claim the foregoing we have hereunto set our hands, at Milwaukee, in the county of Milwaukee and State of Wisconsin, in the presence of two witnesses.

JOSEPH P. SCHOWALTER.
GEORGE A. ROSENBAUER.
JOSEPH MIOTKE.

Witnesses:
N. E. OLIPHANT,
F. C. SCHOWALTER.